(12) United States Patent
Brookes

(10) Patent No.: US 11,068,320 B2
(45) Date of Patent: Jul. 20, 2021

(54) INTERFACE COMBINING MULTIPLE SYSTEMS INTO ONE

(71) Applicant: Firestone Industrial Products Company, LLC, Indianapolis, IN (US)

(72) Inventor: Graham Brookes, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 273 days.

(21) Appl. No.: 14/180,606

(22) Filed: Feb. 14, 2014

(65) Prior Publication Data

US 2015/0234689 A1  Aug. 20, 2015

(51) Int. Cl.
*G06F 9/54* (2006.01)
*G06F 7/00* (2006.01)

(52) U.S. Cl.
CPC .......... *G06F 9/54* (2013.01); *G06F 7/00* (2013.01); *G06F 9/541* (2013.01); *G06F 9/542* (2013.01)

(58) Field of Classification Search
CPC ... G06F 9/54; G06F 9/541; G06F 7/00; G06F 9/542
USPC ................................. 701/31.4, 34.4
See application file for complete search history.

(56) References Cited

U.S. PATENT DOCUMENTS

| | | | | |
|---|---|---|---|---|
| 7,245,898 B2* | 7/2007 | Van Bosch | ............... | H01H 3/14 340/12.22 |
| 7,498,930 B2* | 3/2009 | Phillips | .................. | B60R 11/02 307/10.1 |
| 8,744,668 B2* | 6/2014 | Selkirk | ................ | G07C 5/0808 701/31.4 |
| 2001/0044685 A1* | 11/2001 | Schubert | ............ | B60G 17/0165 701/50 |
| 2002/0032508 A1* | 3/2002 | Uchino | ............ | B60G 17/01933 701/37 |
| 2005/0219062 A1* | 10/2005 | Van Bosch | ............... | H01H 3/14 340/13.24 |
| 2006/0271251 A1* | 11/2006 | Hopkins | ................ | A63H 30/04 701/23 |
| 2007/0106822 A1* | 5/2007 | Phillips | ................... | B60R 11/02 710/11 |
| 2012/0139751 A1* | 6/2012 | Lin | ..................... | B60C 23/0479 340/870.07 |
| 2013/0304306 A1* | 11/2013 | Selkirk | .................. | G07C 5/008 701/31.4 |
| 2013/0311006 A1* | 11/2013 | Ahmad | ................... | B64C 19/00 701/3 |

* cited by examiner

*Primary Examiner* — Khoi H Tran
*Assistant Examiner* — Rodney P King
(74) *Attorney, Agent, or Firm* — Thomas R. Kingsbury; Todd Taylor

(57) ABSTRACT

A vehicle system includes a vehicle, a vehicle control unit (VCU), a plurality of data modules and a data conversion interface. The vehicle includes a chassis that supports the other components of the vehicle, including the VCU. The data modules each provide an output signal with a data type specific to each data module. The data conversion interface couples with the VCU and each data module. The data conversion interface receives the output signal from each data module, converts each output signal into a common data format, and transmits the converted output signals to the VCU.

14 Claims, 2 Drawing Sheets

INTERFACE COMBINING MULTIPLE SYSTEMS INTO ONE

BACKGROUND OF THE INVENTION

1. Field of the Invention

The present invention relates to vehicle electrical systems, and, more particularly, to vehicle interface systems.

2. Description of the Related Art

Modern vehicles are equipped with many different electrical systems for a wide array of purposes. Vehicles can be equipped with systems that better enhance the user's awareness of vehicle conditions, or that allow the vehicle to regulate itself. Such systems can be implemented in the form of modules that connect to a vehicle control unit (VCU). The VCU receives output signals from the modules and can then transmit that information to the user or other vehicle systems. Each VCU is typically limited to a range of input signals that it can effectively process, and each module typically transmits a specific data type.

What is needed in the art is a device or method that allows for more efficient communication between vehicle electrical components.

SUMMARY OF THE INVENTION

The present invention provides a vehicle system including a data conversion interface that enables different data modules with specific data types to commonly communicate with a vehicle control unit.

The invention in one form is directed to a vehicle system including a vehicle, a vehicle control unit (VCU), a plurality of data modules, and a data conversion interface. The vehicle includes a chassis that supports various parts of the vehicle. The vehicle control unit is supported by the chassis. The data modules each provide an output signal that is a specific data type. The data conversion interface is coupled with the VCU and each of the data modules. The data conversion interface is configured to receive output signals from each of the data modules, convert the output signals to a common data format, and transmit the converted output signals to the VCU.

The invention in another form is directed to a method of transmitting data in a vehicle system. The method includes the steps of providing a vehicle that has a plurality of data modules, a vehicle control unit (VCU) and a data conversion interface. Output signals from the data modules, each having a specific data type, are received by the data conversion interface. The data conversion interface converts each specific data type to a common data format. The common data format is then transmitted to the VCU.

An advantage of the present invention is that a data conversion interface can allow for many modules to communicate with one VCU.

Another advantage is a data conversion interface allows for a greater number of output signals with different data formats that can be processed by the VCU, giving module manufacturers more design options.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
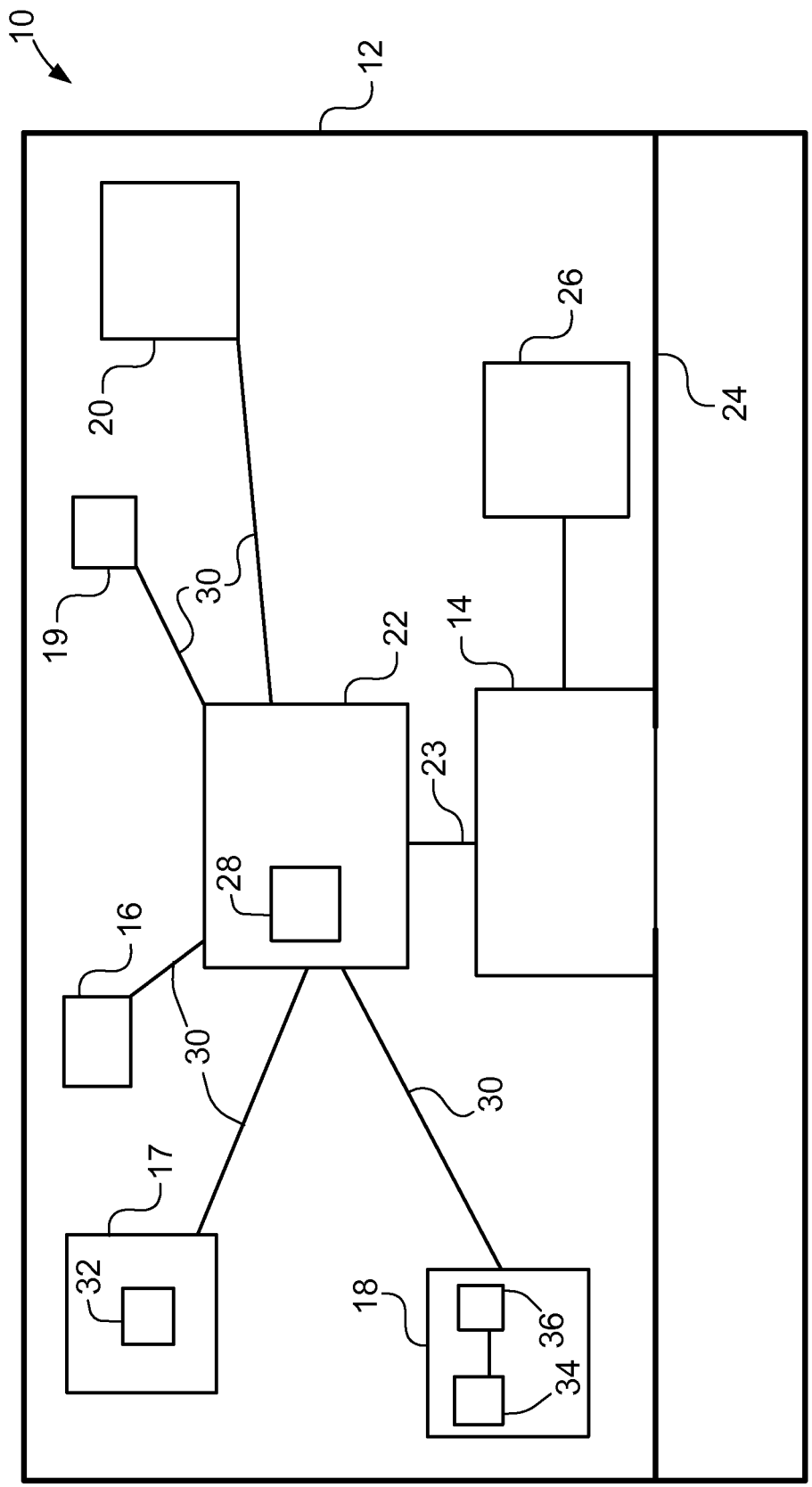
FIG. 1 is a schematic diagram of an embodiment of the present invention.

Referring now to the drawings, and more particularly to FIG. 1, there is shown a schematic illustration of vehicle system 10 which generally includes a vehicle 12, a vehicle control unit (VCU) 14, data modules 16, 17, 18, 19, 20 and a data conversion interface 22. The vehicle 12 includes a chassis 24 that supports the VCU 14 and other components of the vehicle 12. The vehicle 12 can be any type of vehicle that is known in the art e.g. an automobile, semi-trailer truck, train, monorail, etc.

The VCU 14 can be any type of control unit installed within a vehicle and is directly or indirectly carried by the chassis 24 of the vehicle 12. The VCU 14 can be connected to and part of the vehicle's electrical system (not shown) for the electrical power needed to operate the VCU 14. The VCU 14 need not be the only VCU within the vehicle 12, but could be one of several installed VCUs. The VCU 14 is configured to receive, process and transmit a range of electrical data signals. A wide variety of data signal ranges are known in the art, and can include either analog or digital signals. The VCU 14 can receive, process and transmit these data signals in order to control connected systems or components within the vehicle 12. One such system that can be controlled by the VCU 14 is a vehicle telematics system 26. The vehicle telematics system 26 allows for the transmission of data from the vehicle 12 to outside receivers, such as a bypass station or another vehicle. The VCU 14 can transmit a signal to the vehicle telematics system 26 that communicates information about the vehicle 12, e.g., vehicle identification, weight of the vehicle, tire pressure, etc. The vehicle telematics system 26 can then amplify and broadcast the signal(s) to the outside receivers.

Included with the vehicle 12 are data modules 16, 17, 18, 19, 20 that can perform a wide variety of functions, e.g., sensing vehicle parameters, sensing outside conditions, displaying information to a user, etc. Each data module outputs a signal that contains data specific to that particular data module. The specific data can be an analog or digital signal that contains information from the data module. For example, a tire pressure monitoring system 16 can output an analog signal at a particular frequency with varying voltages, which correspond to different tire pressures, to a vehicle control unit that identifies the signal as originating from the tire pressure monitoring system 16. Other data modules 16, 17, 18, 19, 20 that are known in the art and can be included with the vehicle system of the present invention are too numerous to list, but can include a tire pressure monitoring system, a trip computer, a radio-frequency identification emitter, a load sensor, a height controller, a vehicle maintenance sensor, and/or a tire tread sensor.

Also included with the vehicle system 10 of the present invention is a data conversion interface 22 that is coupled with the VCU 14 and each of the data modules 16, 17, 18, 19, 20. The data conversion interface 22 can include a port or line 23 coupled with the VCU 14 and can form different types of connections for coupling with the data modules 16, 17, 18, 19, 20. To communicate with the data modules 16, 17, 18, 19, 20, the data conversion interface 22 can include a wireless transceiver 28 to send and receive wireless signals, and/or traditional wired connections 30. The data conversion interface 22 acts as a converter for the VCU 14, changing the various format signals that are output by the data modules 16, 17, 18, 19, 20 into a common data format that can be processed by the VCU 14. The data conversion interface 22 can be configured to convert an analog signal into a digital signal, a digital signal into an analog signal, an analog signal to a different analog signal, or a digital signal to a different digital signal. Which conversion is performed by the data conversion interface 22 will depend on what data modules and VCU are coupled to the data conversion interface 22. The conversion from specific data types to a common data format can be assisted by the modules. A data module 17 can include a memory 32, which is preloaded with a program that instructs the data conversion interface 22 how to convert the specific data type into the common data format processed by the VCU 14. The data conversion interface configured to receive instruction from a data module on how to convert said specific data type to said common data format. One such common data format is a communications standard adopted by the Society of Automotive Engineers (SAE), commonly known as SAE J1939. After the data conversion interface 22 has converted the specific data signals into a common data format, the converted signal is transmitted to the VCU 14.

After receiving the converted signal from the data conversion interface 22, the VCU 14 can process the converted signal and then transmit control signals to systems and components of the vehicle 12. The data conversion interface 22 can therefore enable two-way communication between the data modules 16, 17, 18, 19, 20 and the VCU 14. One useful application of two-way communication can be to relay vehicle information to a vehicle user through a data module 18, in the form of a user interface, and transmit commands from the user to other data modules 16, 17, 19, 20 or to the vehicle telematics system 26. The user interface 18 can be a plug and play module with an input interface 34 and a processing unit 36 that connects to the data conversion interface 22. Another data module 19, such as a height sensor, can transmit a signal to the data conversion interface 22, which then converts that signal and transmits the converted signal to the VCU 14. The VCU 14, in response, can then transmit a control signal to the data conversion interface 22, which can either transmit the unconverted control signal to the user interface 18 or convert the control signal before transmitting the converted control signal to the user interface 18. The user interface 18, upon receiving the original or converted control signal, can then display the vehicle's height on the input interface 34. The user can then choose to send a signal from the user interface 18 to the VCU 14 through the data conversion interface 22 that prompts the VCU 14 to send a control signal to another data module 20, in the form of a height controller. The user can also choose to send a signal from the user interface 18 to the VCU 14 through the data conversion interface 22 that prompts the VCU 14 to have the vehicle 12 broadcast an information signal using the vehicle telematics system 26.

Figure 2:
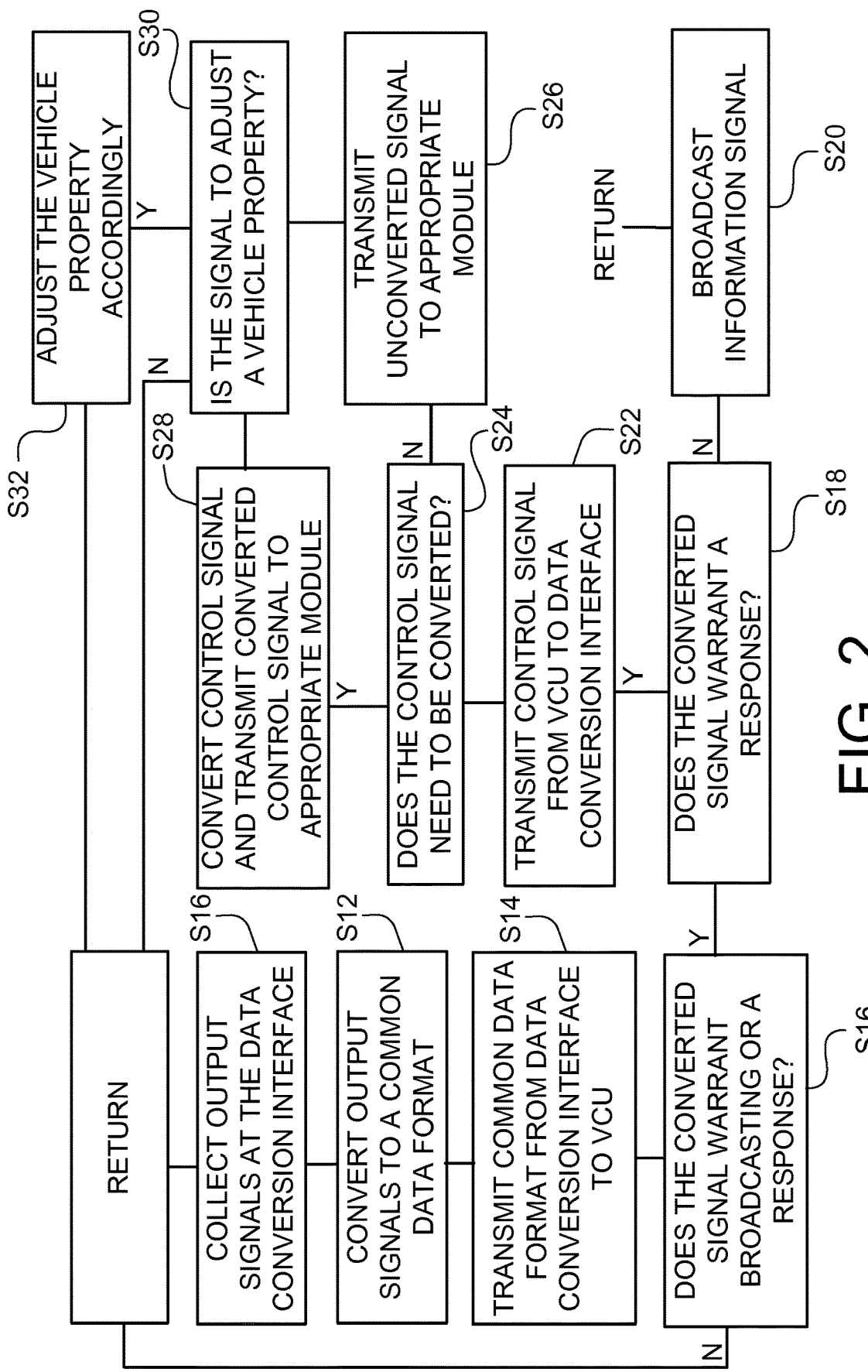
FIG. 2 is a flowchart diagram of a method of the present invention.

Referring now to FIG. 2, a method is shown illustrating how the present invention can be used to direct vehicle signals. A vehicle system 10 previously described is provided that includes a vehicle 12, a vehicle control unit (VCU) 14, multiple data modules 16, 17, 18, 19, 20 and a data conversion interface 22. The output signal(s) from one or more of the data modules 16, 17, 18, 19, 20 are collected at the data conversion interface 22 (S10). The data conversion interface 22 then converts the output signal(s) into a common data format that can be processed by the VCU 14 (S12). The converted signal(s) are then transmitted to the VCU 14 from the data conversion interface 22 (S14). The VCU 14, after receiving the converted signal, can then decide whether the converted signal should be broadcasted or if a control signal should be transmitted to one of the data modules 16, 17, 18, 19, 20 (S16). If the converted signal is going to be broadcasted, an information signal is sent to the vehicle telematics system 26 which will broadcast the information signal (S18, S20). If the control signal is going to be transmitted to one of the data modules 16, 17, 18, 19, 20, the control signal will be sent to the data conversion interface 22 which will determine whether the control signal is converted or not (S22, S24). If the control signal does not need to be converted, the control signal is sent to the appropriate data module(s) (S26). If the control signal needs to be converted, the data conversion interface will convert the control signal to the data module or modules' specific data type and send the converted control signal to the appropriate data module(s) (S28). If the converted or unconverted control signal is to adjust a vehicle property, the appropriate data module will adjust the corresponding vehicle property accordingly (S30, S32).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle system, comprising:
    a vehicle having a chassis;
    a vehicle control unit (VCU) supported by said chassis;
    a plurality of data modules, each said data module configured for providing an output signal with a specific data type, and said plurality of data modules comprising a tire pressure monitoring sensor and at least one of a trip computer, a radio-frequency identification emitter, a load sensor, a height controller, a vehicle maintenance sensor, and a tire tread sensor; and
    a data conversion interface connected in between said VCU and each of said plurality of data modules, said data conversion interface configured to receive said output signal from each of said data modules, convert said output signal from each of said data modules to a common data format, and transmit each of said converted output signals to said VCU,
    wherein at least one of said plurality of data modules includes a memory, said memory having a program that enables communication between said at least one of said plurality of data modules and said data conversion interface, said data conversion interface further configured to receive instruction from said memory on how to convert said specific data type to said common data format,
    wherein said data conversion interface is further configured to enable two-way communication between said plurality of data modules and said VCU.

2. The vehicle system of claim 1, wherein said vehicle control unit utilizes a communications standard adopted by the Society of Automotive Engineers that is commonly known as the J1939 standard.

3. The vehicle system according to claim 1, further comprising a vehicle telematics system connected to said vehicle control unit and configured to communicate with at least one of a bypass station and another vehicle.

4. The vehicle system according to claim 3, wherein at least one of said plurality of data modules is a driver interface installed within said vehicle.

5. The vehicle system according to claim 4, wherein said driver interface comprises an input interface and a processing unit electrically connected to said input interface, said processing unit in communication with said data conversion interface.

6. The vehicle system according to claim 1, wherein said data conversion interface includes at least one of a wireless transmitter and a wireless receiver.

7. The vehicle system according to claim 6, wherein said vehicle is a semi-trailer truck.

8. The vehicle system according to claim 1, wherein said data conversion interface is configured to convert a VCU signal to a module signal and transmit said module signal to at least one of said plurality of data modules.

9. A method of transmitting data throughout a vehicle, comprising the steps of:
    providing a vehicle including a plurality of data modules, a vehicle control unit (VCU), and a data conversion interface, the data conversion interface being connected in between said VCU and each of said plurality of data modules, and said plurality of data modules comprising a tire pressure monitoring sensor and at least one of a trip computer, a radio-frequency identification emitter, a load sensor, a height controller, a vehicle maintenance sensor, and a tire tread sensor;
    collecting a plurality of output signals from a plurality of data modules at said data conversion interface, each output signal having a specific data type;
    converting each specific data type to a common data format within said data conversion interface, said converting including said data conversion interface receiving instruction from at least one of said plurality data modules on how to convert said specific data type to said common data format;
    transmitting said common data format to said VCU;
    transmitting a control signal from said VCU to said data conversion interface; and
    converting said control signal to a specific data type of one of said plurality of data modules, said converting taking place within said data conversion interface such that said data conversion interface enables two-way communication between said plurality of data modules and said VCU.

10. The method according to claim 9, further comprising the step of transmitting said converted control signal to at least one of said plurality of data modules.

11. The method according to claim 10, further comprising the step of adjusting a vehicle property based on said common data format received by said VCU.

12. The method according to claim 11, wherein said adjusting step is performed automatically.

13. The method according to claim 9, further comprising the step of broadcasting an information signal from said vehicle to at least one of a bypass station and another vehicle.

14. The method according to claim 9, wherein said common data format follows a communications standard adopted by the Society of Automotive Engineers that is commonly known as the J1939 standard.

\* \* \* \* \*